United States Patent [19]

Brandenstein et al.

[11] Patent Number: 4,567,976
[45] Date of Patent: Feb. 4, 1986

[54] CLUTCH RELEASE

[75] Inventors: Manfred Brandenstein, Eussenheim; Roland Haas, Hofheim; Wolfgang Friedrich, Schweinfurt, all of Fed. Rep. of Germany

[73] Assignee: SKF Kugellagerfabriken GmbH, Schweinfurt, Fed. Rep. of Germany

[21] Appl. No.: 612,655

[22] Filed: May 21, 1984

[30] Foreign Application Priority Data

May 28, 1983 [DE] Fed. Rep. of Germany ... 8315708[U]

[51] Int. Cl.$^4$ .............................................. F16D 19/00
[52] U.S. Cl. .................................... 192/98; 192/110 B
[58] Field of Search ............................. 192/98, 110 B

[56] References Cited

U.S. PATENT DOCUMENTS

| 3,741,361 | 6/1973 | Brandenstein | 192/98 |
| 4,029,186 | 6/1977 | De Gennes | 192/98 |
| 4,077,504 | 3/1978 | Ernst et al. | 192/98 |
| 4,119,187 | 10/1978 | Ernst et al. | 192/98 |
| 4,125,181 | 11/1978 | Stenzinger | 192/110 B |
| 4,352,419 | 10/1982 | Olschewski et al. | 192/110 B |
| 4,357,058 | 11/1982 | Sonnerat | 192/98 |
| 4,467,904 | 8/1984 | Renaud | 192/98 |

FOREIGN PATENT DOCUMENTS 2811195  9/1979  Fed. Rep. of Germany ........ 192/98

Primary Examiner—Craig R. Feinberg
Assistant Examiner—David A. Okonsky
Attorney, Agent, or Firm—Yuter, Rosen & Dainow

[57] ABSTRACT

A clutch release, in particular for an automobile clutch, comprising a sliding sleeve, a clutch release bearing, and a spring ring for enabling self-centering of the bearing. The thrust plate of the sliding sleeve is provided with a plurality of circumferentially distributed flexible projections of L-shaped profile which engage the contact flange of the nonrotating bearing ring such that the nonrotating bearing ring radially slidably abuts the thrust plate. The thrust plate is provided with through-holes arranged underneath the respective projections in order to facilitate the elastic yielding of the projections during the operation of snapping them on the contact flange. The flexible projections fix the axially position of the nonrotating bearing ring while allowing radial play.

11 Claims, 2 Drawing Figures

CLUTCH RELEASE

BACKGROUND OF THE INVENTION

The present invention relates to a clutch release, in particular for automobile clutches, comprising a sliding sleeve and a clutch release bearing, the nonrotating bearing ring of the bearing radially slidably abutting a flange on a thrust plate and being held in a central position by suitable means.

DE-OS No. 3 025 705 discloses a clutch release in which the thrust plate of the sliding sleeve is provided with elastic clamping means integrally formed on the sliding sleeve and which is in frictional contact with a radial flange of the nonrotating bearing ring. According to this prior art construction the sliding sleeve must be made of a relatively elastic material.

SUMMARY OF THE INVENTION

The object of the present invention is to provide a clutch release of the foregoing type comprising a minimum number of parts and having a sliding sleeve made of an inflexible material, for example, a glass fiber-reinforced plastic. A further object is to provide a clutch release wherein self-centering of the clutch release bearing is not hindered by axial frictional restraint.

These objects are achieved by means of the present invention in which the thrust plate of the sliding sleeve is provided with axially projecting snap claws of L-shaped profile on the side facing toward the clutch. The clearance between the radially inwardly directed portion of each snap claw and the thrust plate is greater than the thickness of the contact flange of the nonrotating bearing ring of the clutch release bearing. The thrust plate is formed with axially directed throughholes in the vicinity of the snap claws. These throughholes allow the snap claws to yield elastically, whereby the snap claws are readily snapped onto the nonrotating bearing ring.

According to a further advantageous improvement of the invention, the throughholes in the thrust plate of the sliding sleeve are formed underneath the axially extending portions of the snap claws and in the radial plane have the same dimensions as those of the radially inwardly directed portions of the snap claws, so that the snap claws can be formed by using a simple extrusion or casting die with axial removable cores.

According to a further feature of the present invention, radial play is provided between the contact flange of the non-rotating bearing ring and the snap claws, the radially inwardly directed portions of which are beveled, so that easy assembly of the clutch release is possible, i.e., easy installment of the clutch release bearing on the sliding sleeve.

BRIEF DESCRIPTION OF THE DRAWINGS

The preferred embodiment of the present invention will now be described in greater detail with reference to the following drawings, wherein.

DETAILED DESCRIPTION OF THE PREFERRED EMBODIMENT

Figure 1:
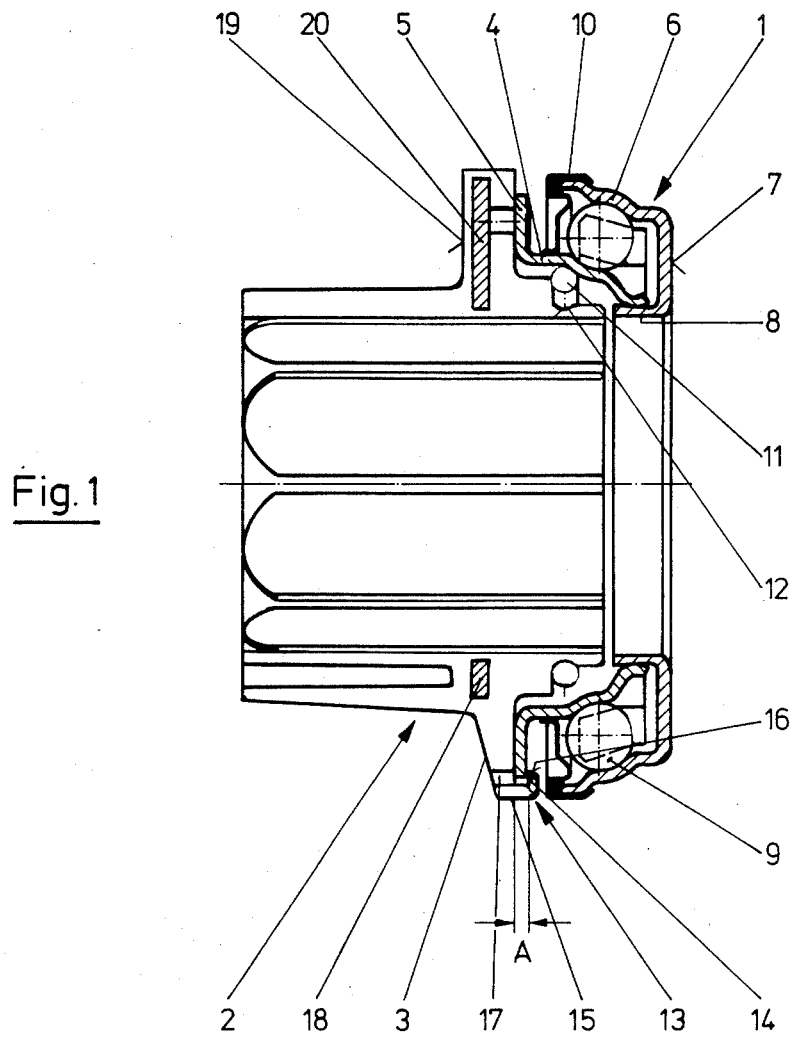
FIG. 1 is a sectional view (taken along section A—A of FIG. 2) of the clutch release according to the present invention wherein the nonrotating bearing ring is axially fixed on the thrust plate of the sliding sleeve by means of snap claws.
Figure 2:
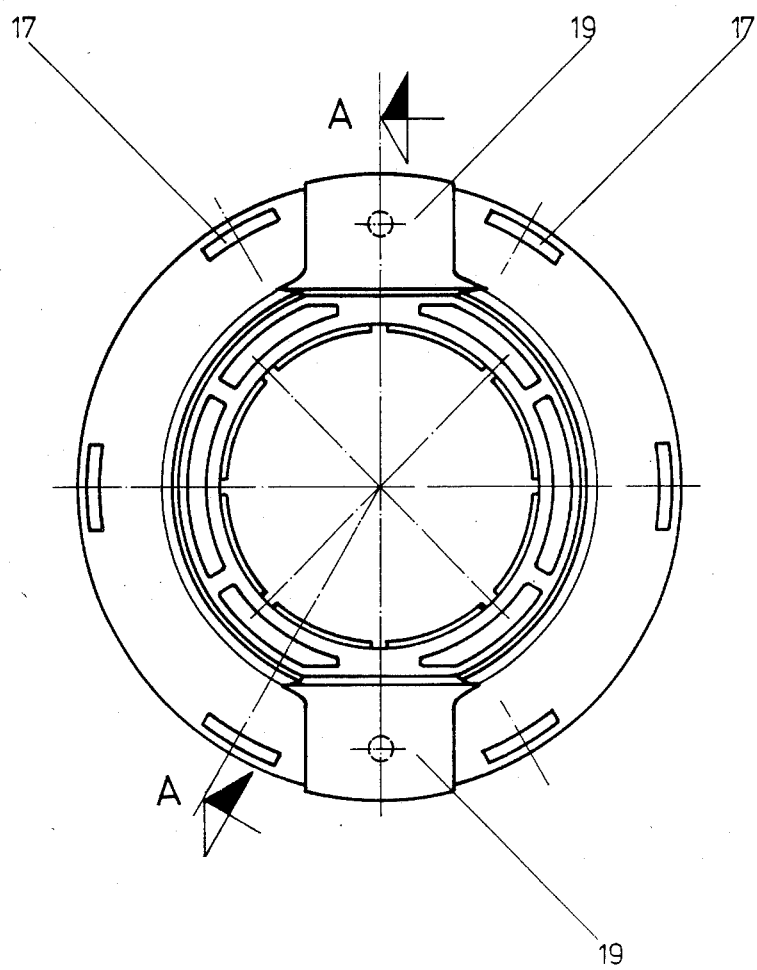
FIG. 2 is a left side view of the sliding sleeve.

The clutch release according to the present invention comprises a clutch release bearing 1 and a sliding sleeve 2 (see FIGS. 1 and 2). The sliding sleeve has a thrust plate 3 integrally formed therewith and is, for example, made of glass fiber-reinforced material. The nonrotating inner ring 4 of clutch release bearing 1, with a radially outwardly disposed contact flange 5, radially slidably abuts the side of thrust plate 3 facing towards the clutch (not shown). The outer ring 6 has a contact surface 7 for engaging the clutch diaphragm spring (not shown) and is provided with an axially extending flange 8 forming a bore. The flange 8 extends behind the axial end of the inner ring 4 with play so that bearing rings 4, 6 and rolling elements 9 are held together when the bearing is not mounted. For this purpose the inner flange 8 of the outer ring may be configured in any conventional manner to hold the bearing rings together. Also, the close proximity of portion 8 with inner ring 4 serves to seal this side of the bearing. The other side of the clutch release bearing is sealed by means of a sheet metal cap 10, which is secured to the rim of outer ring 6 and forms a close clearance with the inner ring 4. A generally oval-shaped spring ring 11 (only partly shown) of bow-shaped profile is arranged in the bore of inner ring 4. Spring ring 11 has a pair of mutually parallel side surfaces which resiliently slidably engage an annular groove 12 formed on the outer surface of sliding sleeve 2, the large diameter portions of ring 11 engaging the bore of the inner ring 4. The nonrotating bearing ring 4 is held in the central position (i.e., coaxial with the sliding sleeve 2) by means of a radially acting frictional force, which arises between the sliding sleeve 2 and the spring ring 11. The thrust plate 3 of sliding sleeve 2 is provided with several snap claws 13 distributed circumferentially on the side facing toward the clutch. These snap claws interlock with the rim of contact flange 5 of inner ring 4, thereby securing the bearing 1 to sliding sleeve 2. The clearance A between the radially inwardly directed portion 14 of snap claws 13 and the thrust flange 3 is greater than the sheet metal thickness of the contact flange 5 of inner ring 4. The rim surface of contact flange 5 and the axially directed portions 15 of the snap claws 13 are arranged so that play therebetween is provided, whereby the nonrotating bearing ring 4 is free to adjust its position. In order to allow snap claws 13 to be easily snapped onto inner ring 4, the end face of the radially inwardly directed portion of each snap claw is beveled and the thrust flange 3 is provided with axially extending throughholes 17 underneath the axially extending portions 15 of snap claws 13, whereby the snap claws 13 are able to flex elastically during snapping of the flange behind them. The height and width of the radially inwardly directed portions 14 are equal to the height and width of the axially extending throughholes 17, so that the snap claws 13 can be formed by using a simple extrusion or casting die with axial removable slides. The sliding sleeve 2 is reinforced with a cast-in sheet metal ring 18, which is provided with diametrally opposed, radially outwardly directed tongues 20 integrally formed therewith in the area of the contact surfaces 19 for the actuating lever (not shown) of the clutch.

The above description of the preferred embodiment is presented for illustrative purposes only and is not intended to limit the scope of the present invention as recited in the appended claims. Modifications may be effected by one having ordinary skill in the art without departing from the scope of the inventive concept herein disclosed.

What is claimed is:

1. In a clutch release comprising a sliding sleeve having a thrust plate, a clutch release bearing having a non-rotating bearing ring with a contact flange which radially slidably abuts said thrust plate, means for holding said contact flange axially with respect to said thrust plate while permitting relative radial displacement therebetween, and means for enabling self-centering of said bearing ring; the improvement wherein said holding means comprises axially projecting snap claws on the side of said thrust plate facing toward the bearing ring, said snap claws having axially extending portions extending toward said bearing ring and terminating in radially inwardly directed portions interlocking axially with said contact flange, the snap claws having a clearance A between the radially inwardly directed portions of said snap claws and said thrust plate that is greater than said thickness of said contact flange on said nonrotating bearing ring, said thrust plate having axially directed throughholes formed therein adjacent said snap claws.

2. A clutch release as recited in claim 1, wherein said throughholes radially underlie the axially extending portions of said snap claws and have equivalent dimensions in a radial plane as those of said radially inwardly directed portions of said snap claws.

3. A clutch release as recited in claim 2, wherein the clearance between radially inner surfaces of said axially extending portions of two diametrically opposed snap claws is greater than the outer diameter of said contact flange of said nonrotating bearing ring.

4. A clutch release as recited in claim 1, wherein the clearance between radially inner end surfaces of said radially inwardly directed portions of diametrically opposed snap claws is slightly smaller than the outer diameter of said contact flange.

5. A clutch release as recited in claim 4, wherein said end surfaces of said radially inwardly directed portions of said snap claws are beveled.

6. The clutch release of claim 1 wherein said sliding sleeve is made of an inflexible material.

7. The clutch release of claim 6 wherein said inflexible material is comprised of a glass fiber-reinforced material.

8. In a clutch release comprising a sliding sleeve having a thrust plate thereon, a clutch release bearing having a nonrotating bearing ring with a contact flange, and means for enabling self-centering of said bearing ring; the improvement wherein a plurality of flexible projections of L-shaped profile are circumferentially distributed about and integrally formed with said thrust plate to engage said contact flange on a side thereof toward said bearing ring such that said nonrotating bearing ring radially slidably abuts said thrust plate, and a plurality of axially extending throughholes are formed in said thrust plate adjacent said projections.

9. A clutch release as recited in claim 8, wherein each of said throughholes radially underlies one of said projections.

10. A clutch release as recited in claim 9, wherein each of said projections comprises an axially extending portion and a radially inwardly directed portion, said throughholes and said radially inwardly directed portions having substantially similar dimensions in a radial plane.

11. A clutch release as recited in claim 10, wherein the clearances between inner surfaces of said axially extending portions and between end surfaces of said radially inwardly directed portions of two diametrically opposed projections are respectively greater and lesser than the outer diameter of said contact flange.

* * * * *